US 6,719,315 B2

(12) United States Patent
Saieg et al.

(10) Patent No.: US 6,719,315 B2
(45) Date of Patent: Apr. 13, 2004

(54) TRAILER SUSPENSION SLIDER ENERGY ABSORBING DEVICE

(75) Inventors: Steven G. Saieg, Sterling Heights, MI (US); James Eckelberry, Canton, OH (US); John K. Ma, Rochester, MI (US); Frank A. Maly, Jr., Beverly Hills, MI (US); Joe Melekian, Rochester Hills, MI (US); Steven R. Miller, Clarkston, MI (US); Nancy L. Saxon, Oakland Township, MI (US); Rajesh J. Somnay, Troy, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 119 days.

(21) Appl. No.: 10/020,599

(22) Filed: Dec. 14, 2001

(65) Prior Publication Data

US 2003/0111820 A1 Jun. 19, 2003

(51) Int. Cl.[7] .............................................. B62D 33/08
(52) U.S. Cl. ................................ 280/149.2; 180/209
(58) Field of Search ..................... 280/149.2, 407.1; 180/209, 271, 272; 293/132, 133, 134, 135, 136

(56) References Cited

U.S. PATENT DOCUMENTS

| | | | | | |
|---|---|---|---|---|---|
| 2,682,419 A | * | 6/1954 | Wolf | ...................... | 280/407.1 |
| 2,753,064 A | * | 7/1956 | Lesser | ......................... | 414/475 |
| 2,831,735 A | * | 4/1958 | Bennett et al. | ................ | 384/42 |
| 5,040,826 A | * | 8/1991 | Lovell | ...................... | 280/6.151 |
| 5,346,233 A | * | 9/1994 | Moser | ....................... | 280/149.2 |
| 5,380,030 A | * | 1/1995 | Gullickson | ................... | 280/486 |
| 5,460,397 A | * | 10/1995 | Shielman | ................... | 280/407.1 |
| 5,947,538 A | * | 9/1999 | White | .......................... | 293/135 |

* cited by examiner

Primary Examiner—David R. Dunn
(74) Attorney, Agent, or Firm—Carlson, Gaskey & Olds (57) ABSTRACT

A trailer suspension slider is provided that includes a suspension bogey. A trailer is supported on the suspension bogey and is longitudinally movable between a plurality of position relative to the suspension bogey. The trailer includes a stop bar to prevent the bogey from sliding out from underneath the trailer during braking if the pins are disengaged. A locking pin mechanism is movable between a locked position in which the locking mechanism couples the suspension bogey and the trailer in one of the plurality of positions and an unlocked position in which the trailer can move relative to the suspension bogey. The suspension bogey may collide violently with the stop bar when braking from a relatively low speed when the pins are unlocked. To this end, an energy absorption device is supported on either the trailer or the suspension bogey. The energy absorption device collapses in response to the stop bar engaging either the energy absorption device or the suspension bogey. Alternatively, an expandable cable may be used between the trailer and suspension bogey to slow the trailer as the stop bar approaches the suspension bogey.

26 Claims, 7 Drawing Sheets

TRAILER SUSPENSION SLIDER ENERGY ABSORBING DEVICE

BACKGROUND OF THE INVENTION

This invention relates to a trailer suspension slider for heavy duty trucks, and more particularly, the invention relates to a method and apparatus for absorbing energy between a trailer and a suspension bogey.

Tractor-trailers may carry very heavy loads in the trailer. Trailer suspension sliders have been used to more efficiently distribute the weight of the cargo. A slider system includes the trailer and a suspension bogey that is movable longitudinally relative to the trailer. The bogey may be moved between a plurality of distinct positions relative to the trailer.

Typically a locking pin mechanism is used to couple the trailer and bogey together in one of the positions. The bogey includes side rails that support several pins that are received in a plurality of holes in flanges extending from the trailer that defines each of the position. To move the bogey relative to the trailer, the pins must be moved out of engagement with the holes. The tractor-trailer is then manipulated to move the trailer along the bogey to a desired position in which the pins are aligned with the desired holes. However, it may be difficult to align the pins with the desired holes such that the pins become fully disposed within the holes to adequately secure the trailer and bogey together. Despite the use of pin location sensing devices, even when the pins appear to be within the holes, the pins may only be partially within the holes making the pins susceptible to become dislodged during braking.

A stop bar has been used on the trailer to limit the forward motion of the trailer relative to the bogey during braking. The stop bar, and possibly the trailer and bogey, may become severely damaged if the stop bar collides with the bogey. A collision at speeds as low as five miles per hour may be sufficient to cause severe damage. Therefore, what is need is a device to absorb the energy between the trailer and bogey when the stop bar undesirably collides with the bogey during braking.

SUMMARY OF THE INVENTION AND ADVANTAGES

The present invention provides a trailer suspension slider including a suspension bogey. A trailer is supported on the suspension bogey and is longitudinally movable between a plurality of position relative to the suspension bogey. The trailer includes a stop bar to prevent the bogey from sliding out from underneath the trailer during braking if the pins are disengaged. A locking pin mechanism is movable between a locked position in which the locking mechanism couples the suspension bogey and the trailer in one of the plurality of positions and an unlocked position in which the trailer can move relative to the suspension bogey. The suspension bogey may collide violently with the stop bar when braking from a relatively low speed when the pins are unlocked. To this end, an energy absorption device is supported on either the trailer or the suspension bogey. The energy absorption device collapses in response to the stop bar engaging either the energy absorption device or the suspension bogey. Alternatively, an expandable cable may be used between the trailer and suspension bogey to slow the trailer as the stop bar approaches the suspension bogey.

Accordingly, the above invention provides a device to absorb the energy between the trailer and bogey when the stop bar undesirably collides with the bogey during braking.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
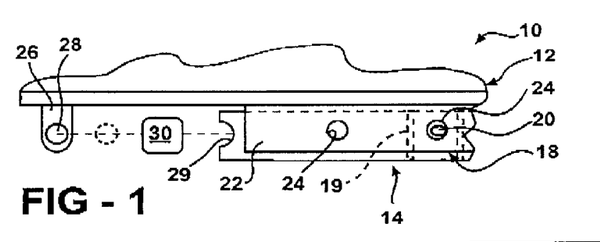
FIG. 1 is a schematic view of a trailer suspension slider with the energy absorbing device of the present invention.

A slider system 10 is shown in FIG. 1. The slider system 10 includes a trailer 12 supported on a suspension bogey 14. The bogey 14 has spaced apart parallel rails 16 that cooperate with spaced apart flanges 22 on the trailer 12 to laterally locate the trailer 12 relative to the bogey 14. Several locking pin mechanisms 18 are secured to portions of the bogey 14 by pin cages 19 for actuating locking pins 20 between locked and unlocked positions. The flanges 22 include a plurality of holes 24 arranged longitudinally thereon to define a plurality of positions. Brackets 26 support a stop bar 28 on the trailer 12 to limit the forward movement of the trailer 12 during braking if the pins 20 are not disposed within the holes 24. The stop bar 28 is received within a notch 29 in the rail 16. As discussed above, a collision between the stop bar 28 and rail 16 may cause severe damage to the slider system 10. To this end, the present invention incorporates an energy absorption device 30, shown highly schematically in FIG. 1, within the slider system 10 to minimize or eliminate any potentially damaging forces during such a collision.

Figure 2A:
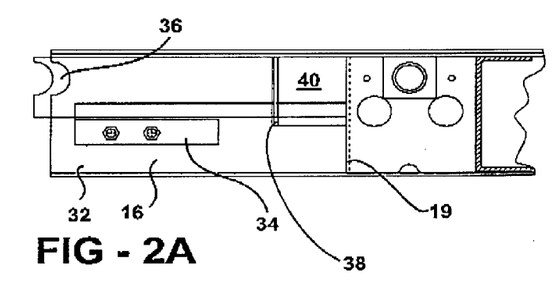
FIG. 2A is an embodiment of the present invention energy absorbing device.
Figure 2B:
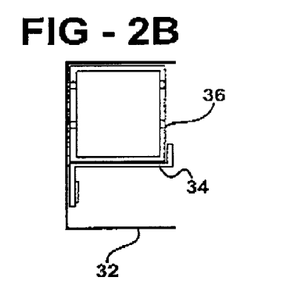
FIG. 2B is an end view of the energy absorbing device shown in FIG. 2A.
Figure 2C:
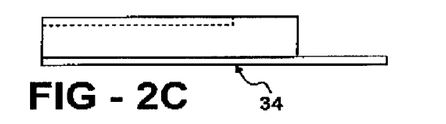
FIG. 2C is a top view a bracket shown in FIG. 2A.
Figure 3A:
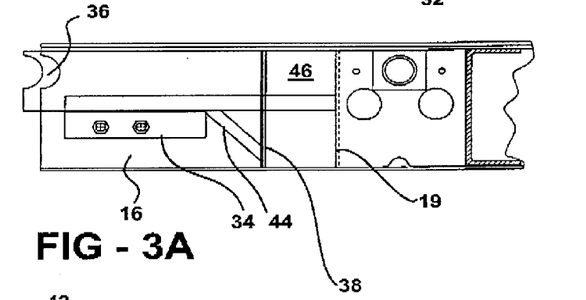
FIG. 3A is another embodiment of the present invention energy absorbing device.
Figure 3B:
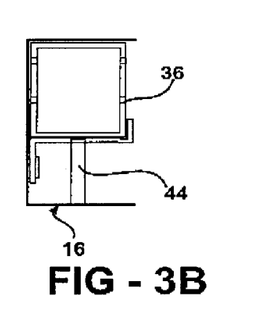
FIG. 3B is an end view of the energy absorbing device shown in FIG. 3A.
Figure 3C:
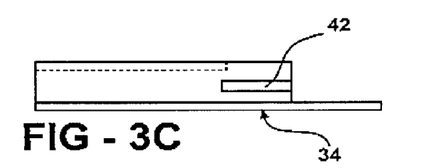
FIG. 3C is a top view a bracket shown in FIG. 3A.

Referring to FIGS. 2A–2C, the rail 16 may be constructed from a C-channel 32 and an S-bracket 34 secured to the C-channel. A sliding member 36, which may be constructed from a square tube, is supported between the C-channel 32 and S-bracket 34. The tube 36 has a plate 38 welded to an end of the tube 36 near a portion of the pin cage 19. The plate 38 extends past the member 36 to retain it on the rail 16. An energy absorption device 40, such as a block of rubber or urethane, is arranged between the plate 38 and pin cage 19 for compression and energy absorption during a collision between the stop bar and the member 36. FIGS. 3A–3C depict a similar arrangement, but with increased energy absorption. The plate 38 is extended to the full height of the rail 16, and a brace 44 extends from the member 36 to the plate 38. A slot 42 is cut into the S-bracket 34 to accommodate the brace 44. As a result, a larger block 46 of energy absorbing material may be arranged between the pin cage 19 and plate 38.

Figure 4A:
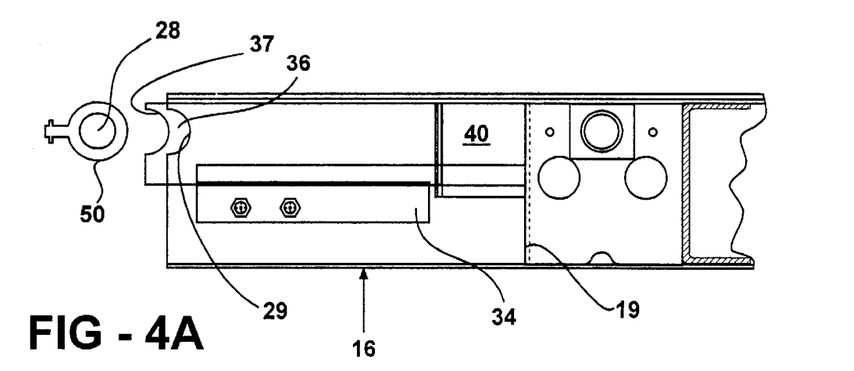
FIG. 4A is yet another embodiment of the present invention energy absorbing device.
Figure 4B:
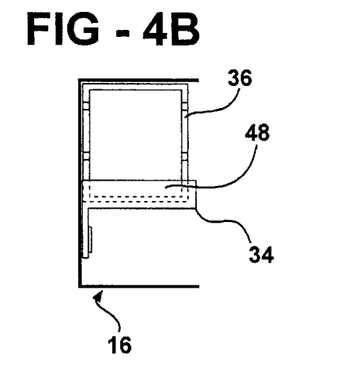
FIG. 4B is an end view of the energy absorbing device shown in FIG. 4A.
Figure 4C:
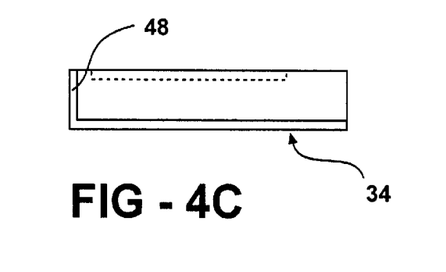
FIG. 4C is a top view a bracket shown in FIG. 4A.

FIGS. 4A–4C depict an arrangement similar to FIGS. 2A–2C with slight modifications. S-bracket 34 includes a lip 48 to retain the member 36 on the rail 16. An energy absorbing material 50 has been added around the stop bar 28 to further cushion the blow when the stop bar 28 hits the notch 37 in member 36 and then hits the notch 29 in the rail 16 after collapsing energy absorbing device 40.

Figure 5:
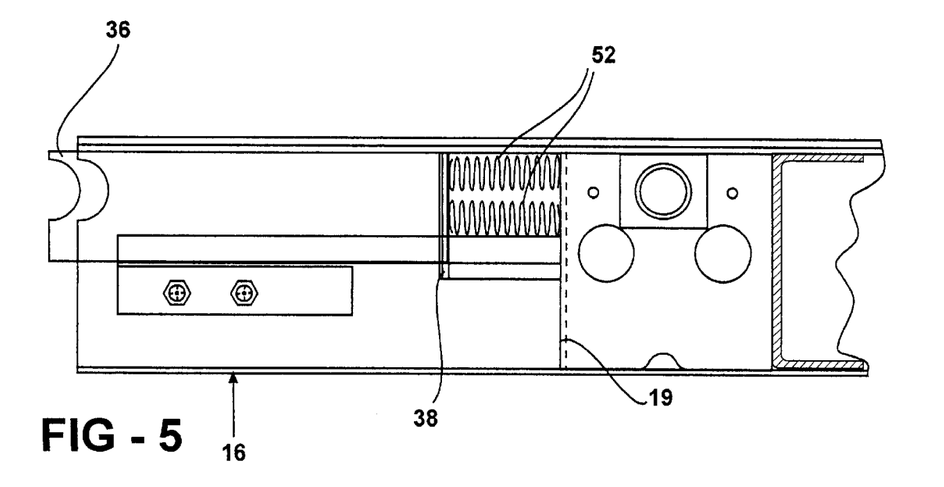
FIG. 5 is still another embodiment of the present invention energy absorbing device.
Figure 6:
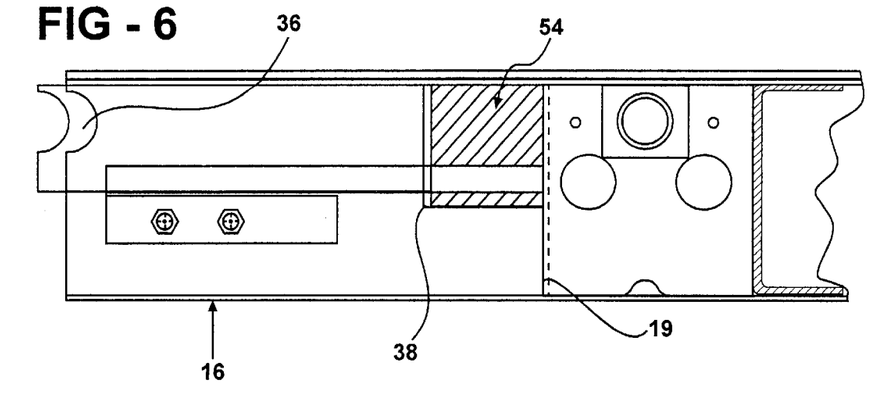
FIG. 6 is another embodiment of the present invention energy absorbing device.
Figure 7:
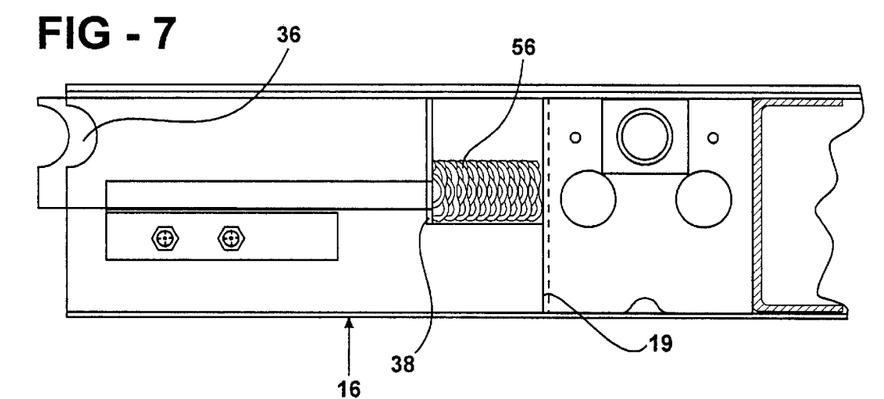
FIG. 7 is another embodiment of the present invention energy absorbing device.

FIG. 5 utilizes springs 52 between the plate 38 and pin cage 19 to absorb energy. FIG. 6 utilizes a honeycomb-shaped structure 54 between the plate 38 and pin cage 19, which collapses during an impact. The structure 54 may be constructed from any suitable material. Alternatively, a collapsible corrugated metallic member 56 may be arranged between the plate 38 and pin cage 19, as shown in FIG. 7.

Figure 8:
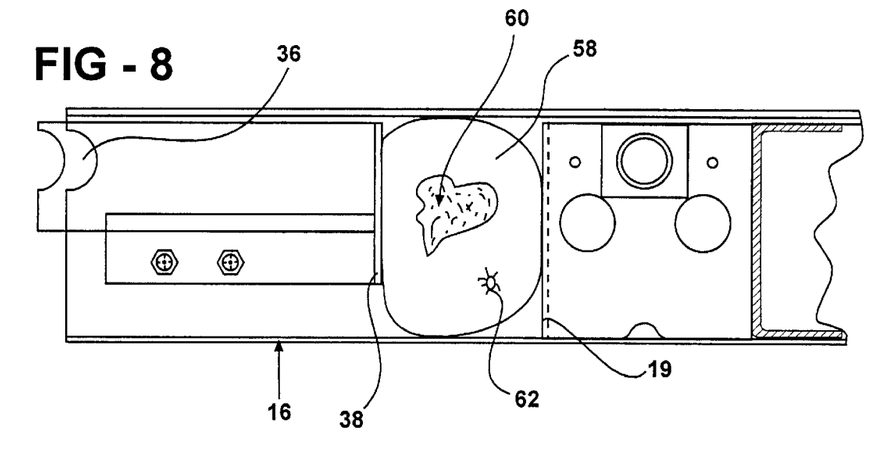
FIG. 8 is another embodiment of the present invention energy absorbing device.

Referring to FIG. 8, a container 58 filled with material 60, such as air, water, or foam, may be used as an energy absorption device. The container 58 may include a valve 62 that permits expulsion of the material 60 from the container 58 at a predetermined impact.

Figure 9:
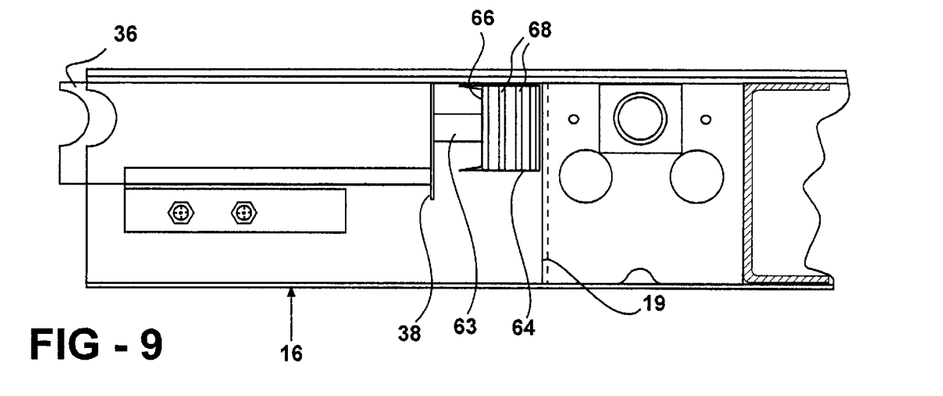
FIG. 9 is another embodiment of the present invention energy absorbing device.
Figure 10:
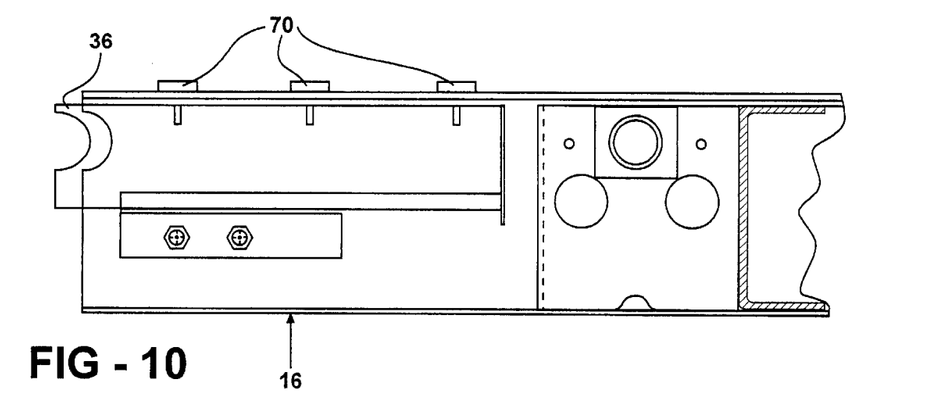
FIG. 10 is another embodiment of the present invention energy absorbing device.

Frangible energy absorption devices may also be used. The plate 38 may include a protrusion 63, as shown in FIG. 9. A housing 64 includes a plurality of webs 66, 68 arranged transverse to the member 36. Preferably, the web 66 closest to the protrusion 63 is thicker than the other webs 68 to define the desired impact at which the webs 66, 68 will break to absorb the impact. Referring to FIG. 10, a plurality of shear pins 70 are used to connect the member 36 to the rail 16. The pins 70 are broken at a predetermined impact between the stop bar and rail 16.

Figure 11:
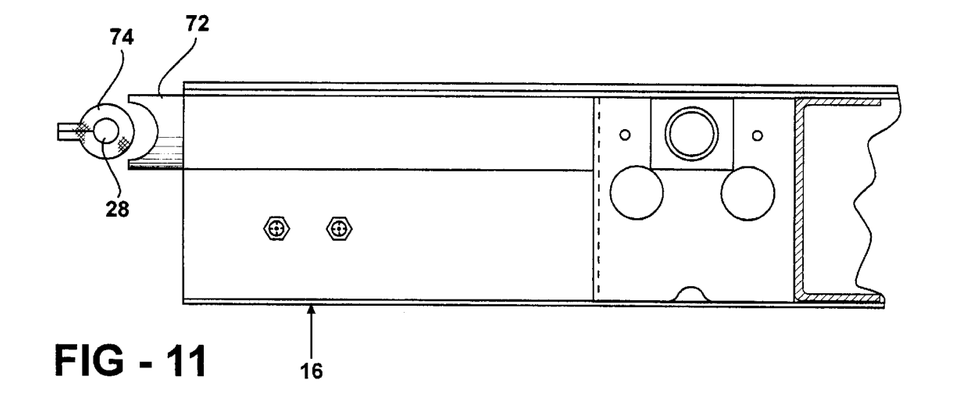
FIG. 11 is another embodiment of the present invention energy absorbing device.
Figure 12:
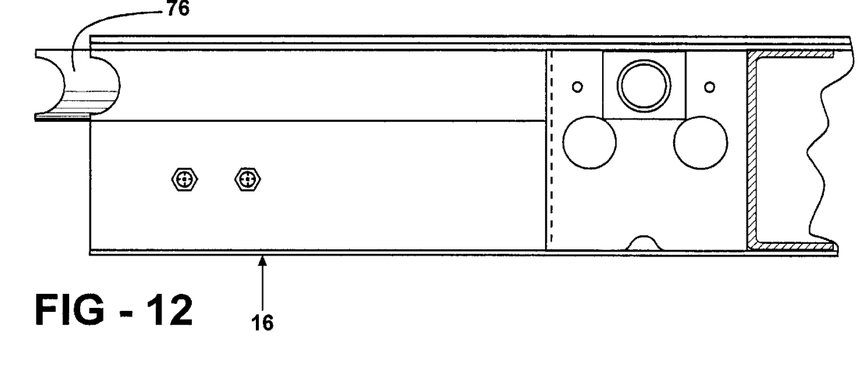
FIG. 12 is another embodiment of the present invention energy absorbing device.

Referring to FIG. 11, an elastic member 72 may be secured to the end of the rail 16. Another elastic member 74 may be secured about the stop bar 28. Preferably, the radius of the elastic member 74 is larger than the elastic member 72 so that the members 72, 74 deform both vertically and horizontally to provide maximum energy absorption. Alternatively, only the rail 16 may include an elastic member 76, as shown in FIG. 12.

Figure 13:
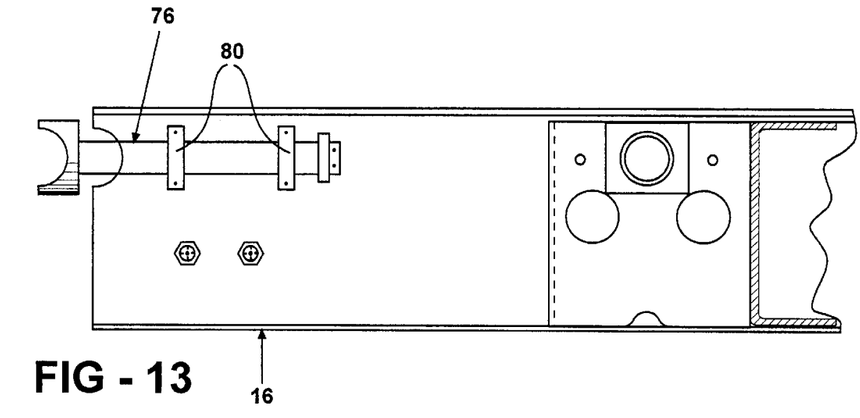
FIG. 13 is another embodiment of the present invention energy absorbing device.
Figure 14:
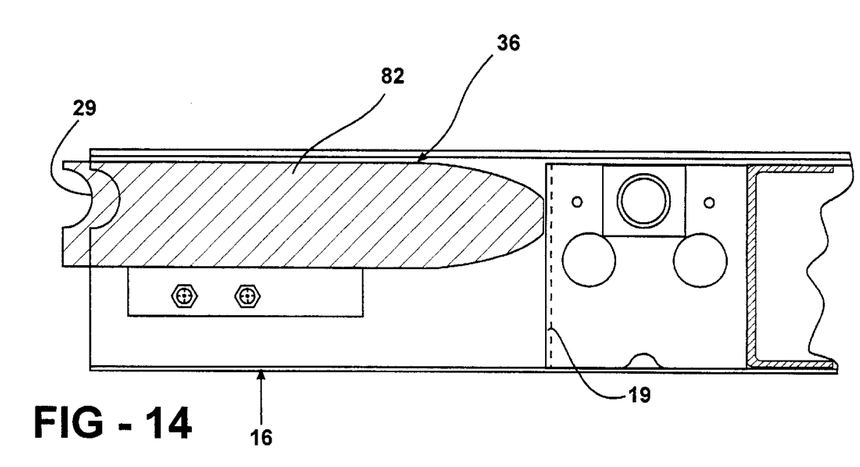
FIG. 14 is another embodiment of the present invention energy absorbing device.

A shock absorber 78 may be secured to the rail 16 by brackets 80, as shown in FIG. 13. Referring to FIG. 14, the member 36 may be constructed from an elastic material 82. One end of the member 36 is arranged in abutting relationship with the pin cage 19, and the other end of the member 36 includes the notch 29 for receiving the stop bar.

Figure 15:
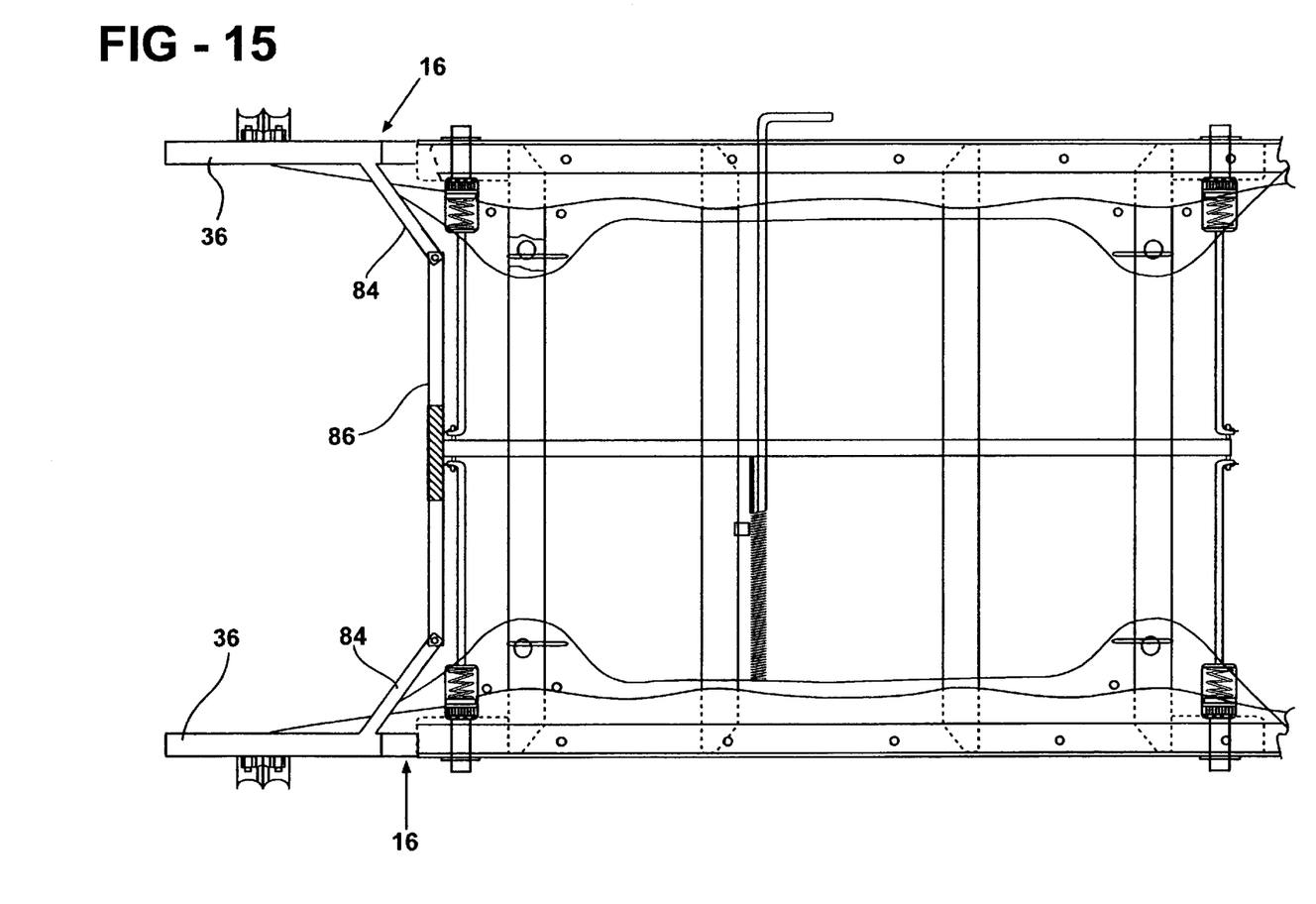
FIG. 15 is another embodiment of the present invention energy absorbing device.

FIG. 15 includes linkages 84 that are connected to the members 36. The linkages 84 are connected to opposing ends of a lateral energy absorption member 86. As the members 36 slide forward during an impact, the linkages transmit the force to the member 86 and compresses the member 86.

Figure 16:
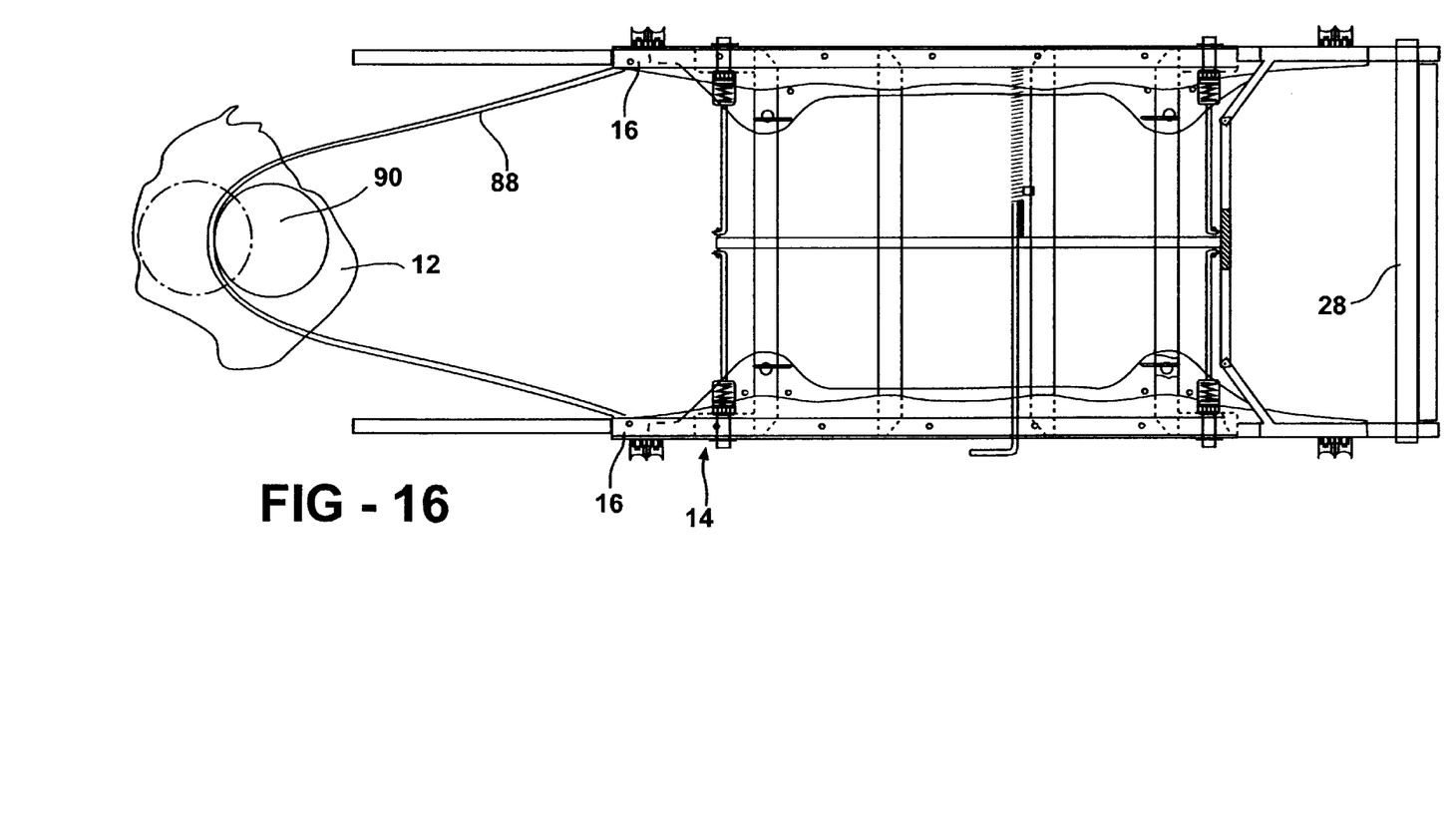
FIG. 16 is another embodiment of the present invention energy absorbing device.

Referring to FIG. 16, an elastic cable 88 is connected between the trailer 12 and bogey 14. Ends of the cable 88 may be connected to the rails 16 and held in tension by a spring loaded pulley 90 for taking up slack in the cable 88 throughout the various positions of the slider. During braking, the cable 88 stretch to slow the bogey 14 as the rails 16 approaches the stop bar 28.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A method of absorbing energy between a trailer and a trailer suspension bogey comprising the steps of:
   a) providing an energy absorption device on at least one of a trailer and a suspension bogey;
   b) moving the trailer along the trailer suspension bogey; and
   c) collapsing the energy absorption device when the trailer reaches a predetermined position relative to the trailer suspension bogey in response to performing step b).

2. The method according to claim 1, wherein the trailer includes a stop bar and step b) includes moving the stop bar toward the trailer suspension bogey.

3. The method according to claim 1, wherein step c) includes plastically deforming the energy absorption device.

4. The method according to claim 1, wherein step c) includes elastically deforming the energy absorption device.

5. The method according to claim 1, wherein step c) includes fracturing the energy absorption device.

6. The method according to claim 1, wherein step c) includes expelling material from a container.

7. A trailer suspension slider comprising:
   a suspension bogey;
   a trailer supported on said suspension bogey longitudinally movable between a plurality of positions relative to said suspension bogey, said trailer including a stop defining a forward position of said trailer relative to said suspension bogey;
   a locking mechanism movable between a locked position in which said locking mechanism couples said suspension bogey and said trailer in one of said plurality of positions and an unlocked position in which said suspension bogey is longitudinally movable relative to said trailer toward said stop; and
   an energy absorption device supported on one of said trailer and said suspension bogey, said energy absorption device collapsing in response to said stop engaging one of said energy absorption device and said suspension bogey.

8. The slider according to claim 7, wherein said suspension bogey includes a portion supporting a member movable relative to said portion in response to said stop engaging said member with said energy absorption device arranged between said member and said portion.

9. The slider according to claim 8, wherein said suspension bogey includes a rail and a bracket scoured to said rail together defining said portion with said member extending longitudinally and slidingly supported between said rail and said bracket.

10. The slider according to claim 8, wherein said energy absorption device elastically deforms in response to said stop engaging said member.

11. The slider according to claim 10, wherein said energy absorption device is constructed from a robber-containing material.

12. The slider according to claim 10, wherein said energy absorption device is constructed from a urethane-containing material.

13. The slider according to claim 10, wherein said energy absorption device is a spring.

14. The slider according to claim 10, wherein said member is said energy absorption device.

15. The slider according to claim U), wherein said member includes a linkage interconnecting said member to said energy absorption device with said energy absorption device arrange transverse to said rail.

16. The slider according to claim 8, wherein said energy absorption device plastically deforms in response to said stop engaging said member.

17. The slider according to claim 16, wherein said energy absorption device is a honeycomb-Shaped structure.

18. The slider according to claim 16, wherein said energy absorption device is a metallic corrugated member.

19. The slider according to claim 16, wherein said energy absorption device includes a plurality of shear pins interconnecting said portion and said member.

20. The slider according to claim 16, wherein said energy absorption device includes a housing having a plurality of frangible spaced apart webs with said member breaking said webs in response to said stop engaging said member.

21. The slider according to claim 8, wherein said energy absorption device includes a container filled with material expelled from said container in response to said stop engaging said member.

22. The slider according to claim 21, wherein said container includes a valve with said material expelled through said valve.

23. The slider according to claim 21, wherein said material is a fluid.

24. The slider according to claim 21, wherein said material is a foam.

25. The slider according to claim 7, wherein said energy absorption device includes a shock absorber extending from said suspension bogey toward said stop when said stop engages said shock absorber.

26. The slider according to claim 7, wherein said energy absorption device includes an elastic material scoured to at least one of said stop and a portion of said suspension bogey adjacent to said stop.

* * * * *

UNITED STATES PATENT AND TRADEMARK OFFICE
CERTIFICATE OF CORRECTION

PATENT NO. : 6,719,315 B2 Page 1 of 1
DATED : April 13, 2004
INVENTOR(S) : Saieg et al.

It is certified that error appears in the above-identified patent and that said Letters Patent is hereby corrected as shown below:

<u>Column 5,</u>
Line 5, "scoured" should read as -- secured --
Line 13, "robber-containing" should read as -- rubber-containing --
Line 22, "claim U)" should read as -- claim 10 --

<u>Column 6,</u>
Line 26, "scoured" should read as -- secured --

Signed and Sealed this

Eighth Day of June, 2004

JON W. DUDAS
*Acting Director of the United States Patent and Trademark Office*